United States Patent [19]

McCombs et al.

[11] 4,342,573
[45] Aug. 3, 1982

[54] COMPACT OXYGEN CONCENTRATOR

[75] Inventors: Norman R. McCombs, Tonawanda, N.Y.; John Schlaechter, Grandview, Ohio

[73] Assignee: Greene & Kellogg, Incorporated, Tonawanda, N.Y.

[21] Appl. No.: 84,374

[22] Filed: Oct. 12, 1979

[51] Int. Cl.³ .............................................. B01D 53/04
[52] U.S. Cl. ....................................... 55/161; 55/179; 55/208; 55/276; 55/387; 55/494
[58] Field of Search .................................. 55/161–163, 55/179–181, 208, 276, 387, 389, 390, 494, 528, DIG. 13, DIG. 17; 417/299, 363, 368

[56] References Cited

U.S. PATENT DOCUMENTS

| | | | |
|---|---|---|---|
| 1,812,113 | 6/1931 | Nelson | 417/363 X |
| 2,204,431 | 6/1940 | Moore et al. | 55/179 |
| 2,248,225 | 7/1941 | Fonda | 55/179 X |
| 2,284,980 | 6/1942 | Mantle | 417/299 |
| 2,454,570 | 11/1948 | Rector | 417/363 |
| 2,569,537 | 10/1951 | Robbins | 55/208 X |
| 2,743,052 | 4/1956 | Ferrari | 417/363 |
| 2,746,255 | 5/1956 | Fitch et al. | 55/DIG. 17 |
| 2,796,143 | 6/1957 | Longenecker et al. | 55/316 |
| 2,979,828 | 4/1961 | Westeren | 55/179 X |
| 3,193,184 | 7/1965 | Hopper | 417/299 |
| 3,323,291 | 6/1967 | Kern | 55/179 X |
| 3,543,482 | 12/1970 | Foster | 55/179 X |
| 3,594,990 | 7/1971 | Hawley | 55/208 X |
| 3,731,460 | 5/1973 | Narumi | 55/179 |
| 3,744,976 | 7/1973 | Tongue | 55/316 X |
| 3,804,942 | 4/1974 | Kato et al. | 55/387 X |
| 3,882,961 | 5/1975 | Cannan et al. | 55/276 X |
| 4,047,909 | 9/1977 | Hofmann | 55/276 X |
| 4,174,955 | 11/1979 | Blackmer et al. | 55/276 X |

FOREIGN PATENT DOCUMENTS

| | | | |
|---|---|---|---|
| 534938 | 5/1930 | Fed. Rep. of Germany | 55/179 |
| 2243071 | 3/1973 | Fed. Rep. of Germany | 55/387 |
| 699880 | 11/1953 | United Kingdom | 55/387 |
| 875547 | 8/1961 | United Kingdom | 417/363 |
| 1454543 | 11/1976 | United Kingdom | 55/DIG. 13 |

Primary Examiner—Robert H. Spitzer
Attorney, Agent, or Firm—Browdy and Neimark

[57] ABSTRACT

A machine for concentrating the oxygen in air for medical purposes utilizing any pressure swing adsorption (PSA) technique and comprising a combination of features to provide a light weight, reliable and compact device, especially suited for home use.

40 Claims, 16 Drawing Figures

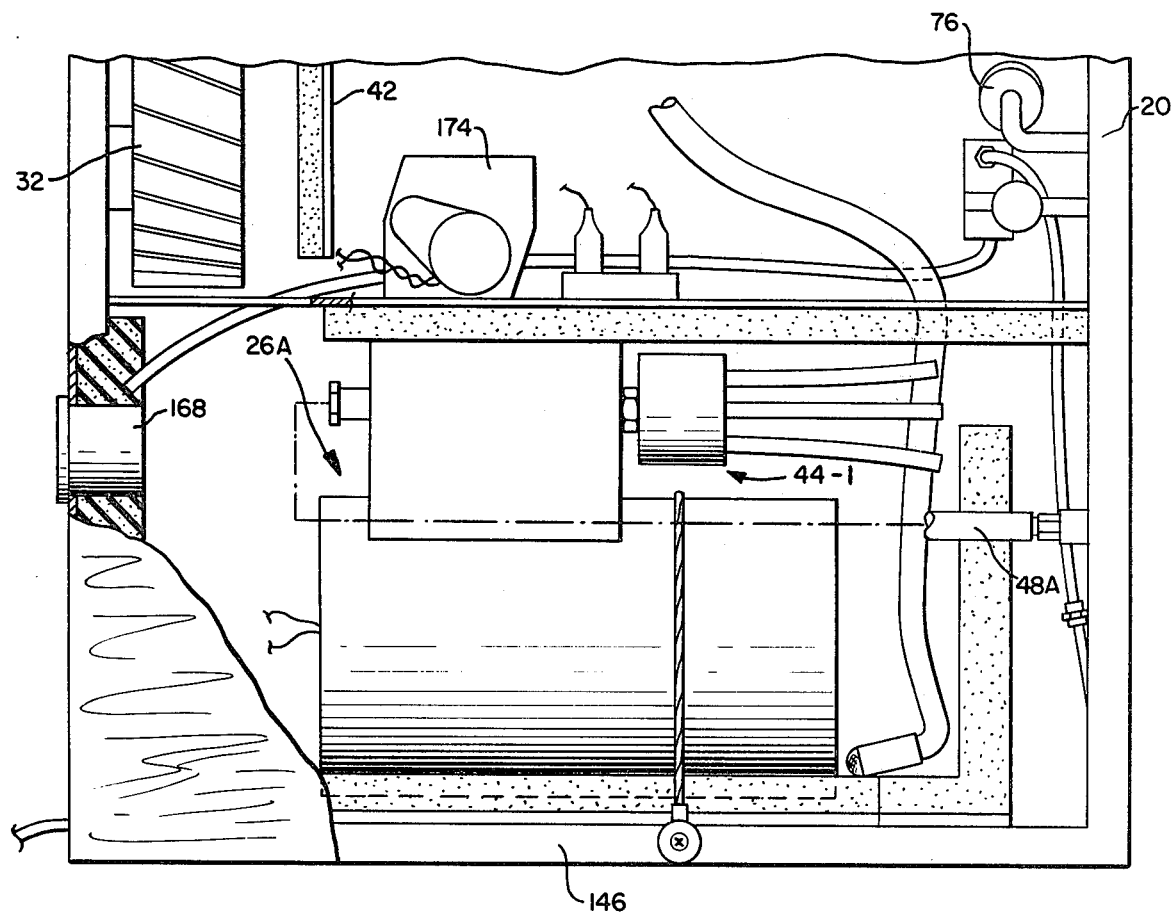

COMPACT OXYGEN CONCENTRATOR

This invention pertains to an improved device to house a pressure swing adsorption (PSA) cycle to concentrate a selected gas out of a mixture of gases. More in particular, the invention pertains to such a device to concentrate oxygen out of air and to supply such oxygen for medical purposes, such as to people having various respiratory ailments requiring oxygen rich air. Heretofore, such users have depended upon cylinders of oxygen in their home, or have used larger and heavier concentrator machines.

The present invention provides a machine comparable to the prior art machines, which has the improvements of being exceptionally compact and light weight. Oxygen concentrator machines have well known advantages over tanks of oxygen and the present invention retains all of those advantages. In addition, the invention machine has other advantages over this prior art.

The present invention is not concerned with the PSA cycle per se. It can be used with any such cycle and has the capacity to accept virtually any multi-bed or single-bed system with suitable modifications to the manifolding between the valves, and/or changes to the vessels for the adsorbent beds. Thus, another advantage of the invention is that it is amenable to use with many different PSA cycles.

The combination of features which together make up the improved compact oxygen concentrator of the invention include division of the inside of the cabinet into a lower warmer compressor space, and an upper component space, with certain interfitting relationships between the two spaces, and with improved insulating and sound deadening means which serve additional purposes for the lower space. There is a third space which is substantially completely filled by the PSA beds.

Another advantage resides in the particular configuration of the tanks or vessels housing the adsorbent beds, which tanks are strong, while at the same time being of a compact, square or rectangular cross-sectional design, permitting them to be packed densely into their space in the cabinet, again aiding in the obtaining of a relatively small and light weight unit. The vessels are advantageously made primarily from lengths of metal pipe.

Yet another advantage is the coiled tube heat exchanger functionally located in the process air stream and physically located in the stream of cooling air flowing through the lower cabinet space. This feature aids in achieving the compactness of the invention by, in effect, obtaining double duty from the cooling air. In addition the coiled tube heat exchanger serves as the physical support for an intake air filter.

Another advantage is the unique electrical circuit for starting comprising the use of an unloading or "dumping" valve in the process air stream together with a particular type of relatively efficient motor.

A further advantage is the provision of two different alternate means to mount the motor in its space, both said means being of extremely light weight while at the same time permitting secure and safe shipment and quick and simple mounting and dismounting of the motor. In use, the motor is located in a formed cavity in the insulation of the lower cabinet space and it remains in place of its own weight with no metal-to-metal contact. This improved motor mounting is a substantial weight reducer as compared to the prior art.

Another advantage resides in alternate forms of combined muffler and filter for the process air intake which use simple easily disassembled plastic parts to thereby achieve low cost and light weight, while permitting easy cleaning or replacement of the intake muffler/filter pad. This combined muffler/filter can be mounted in either the upper or the lower cabinet space.

Yet another advantage resides in the means to dispose of the water removed from the process air, which comprises flowing this water into the insulating plastic foam in the lower cabinet space, thus causing it to be evaporated by the heat therein and to be carried away in the stream of cooling air.

Still a further advantage resides in two alternate forms of manifolding arrangement permitting different methods of mounting the solenoid valves and certain associated parts with respect to the cabinet and to the beds.

The above and other advantages of the invention will be pointed out or will become evident in the following detailed description and claims, and in the accompanying drawings also forming a part of the disclosure, in which:

FIG. 11 is a view like FIG. 5 showing the preferred mounting of the preferred filter/muffler in the lower cabinet space directly on the motor/compressor;

Figure 1:
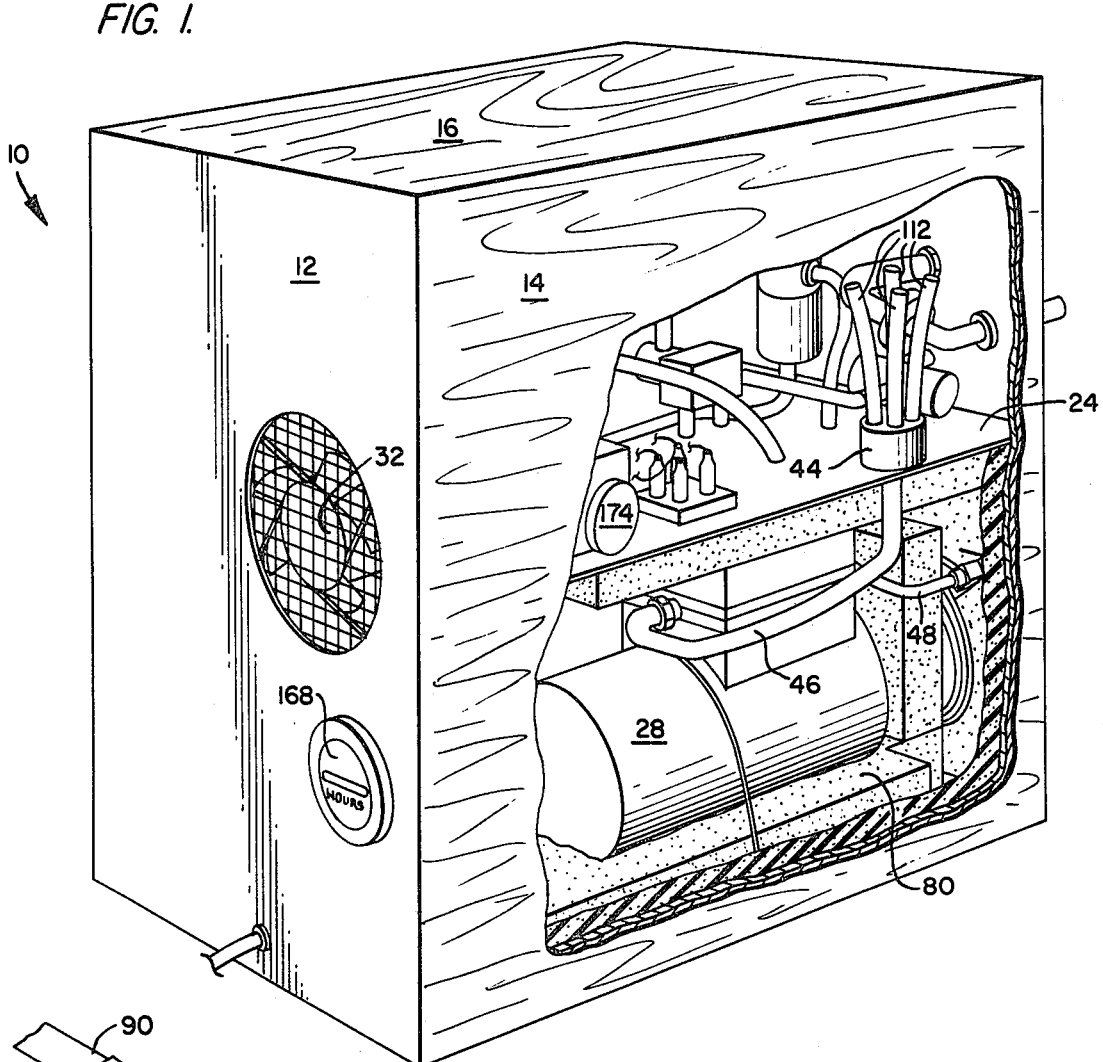
FIG. 1 is a perspective showing of a compact oxygen concentrator embodying the invention, with a side wall partly broken away to show some of the internal parts.

Referring now in detail to the drawings, in FIG. 1 a compact oxygen concentrator 10 is shown comprising a rear wall 12, a pair of side walls 14 (only one of which is shown) a top wall 16, a bottom wall 18, and a front wall 20. The internal cabinet space is functionally divided into three spaces; a lower cabinet space housing the motor/compressor and other components, an upper cabinet space housing the bulk of the controls, and a full height space, see FIGS. 13 and 14, housing the adsorbent beds. These spaces are defined in part by an "L-shaped" wall which comprises a horizontal wall portion 24 which separates the upper and lower spaces from each other; and a vertical wall portion 22 extending upwardly from the inner end of the horizontal wall portion to define the bed space. Insulation, as described below, extends below the horizontal wall portion 24 and is coplanar with the vertical wall portion 22 to separate the lower cabinet space from the bed space.

The invention is not limited to use with any particular PSA cycle per se. As will be described in detail below, the current commercial form of the inventon utilizes a three bed system, but more or fewer beds, including single bed systems, could also be used with suitable modifications well known to those skilled in these arts. As examples of cycles with which the invention could be used, reference may be had to Walter U.S. Pat. No. 3,977,845 and Lee U.S. Pat. No. 3,788,036. Said patents are mentioned as being indicative of the large body of patents pertaining to PSA and not to indicate a preferred cycle for use in the invention.

Figure 4:
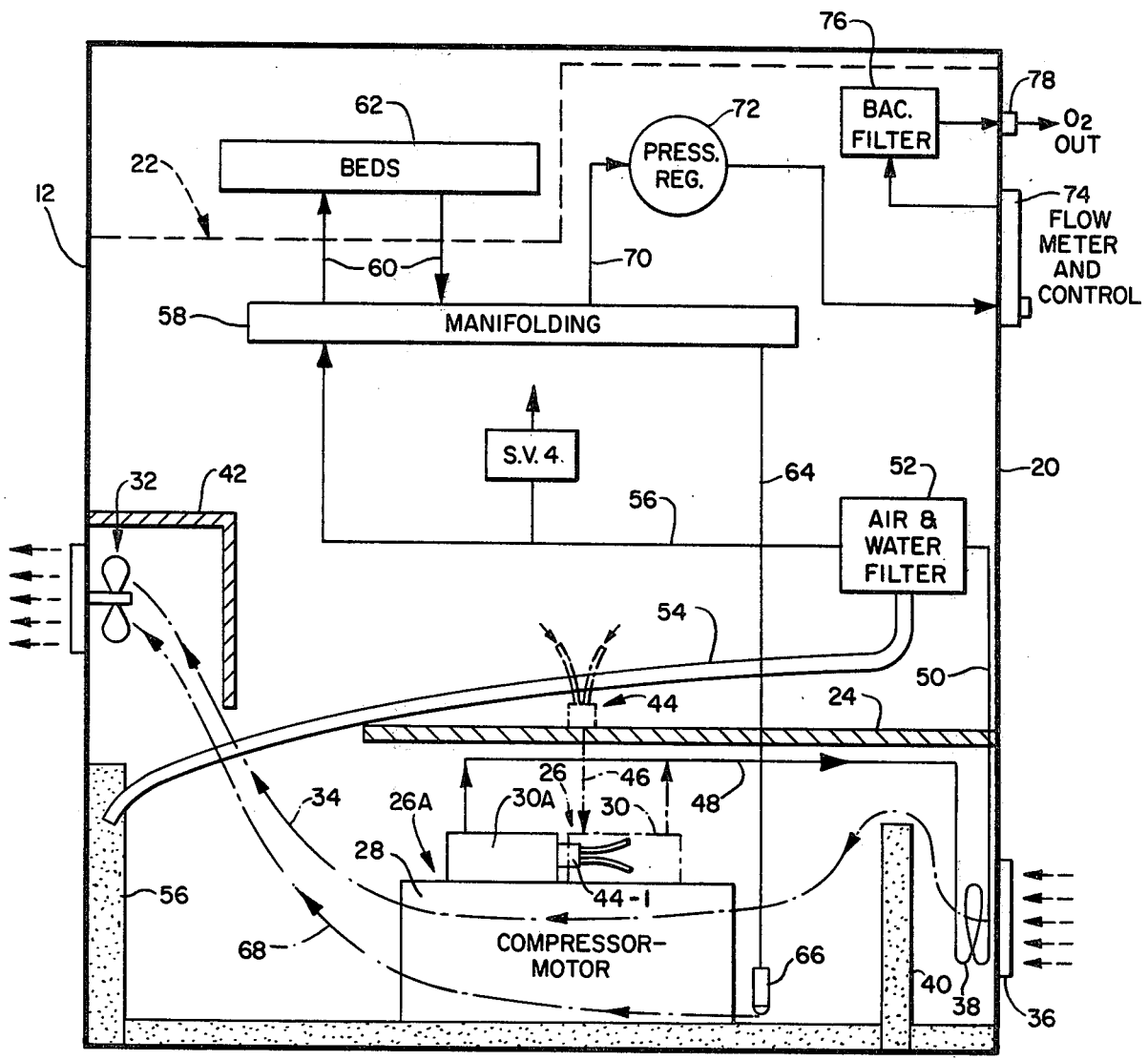
FIG. 4 is a schematic view showing the air flows and functional component arrangement.

Schematic FIG. 4 shows the overall modus operandi of the invention. A commercial combined compressor/electric motor device 26 is mounted in the lower space under horizontal wall 24 by means described below, and this device comprises an electric motor portion 28 and a compressor portion 30. A fan 32 is mounted in a suitably formed opening in the rear wall 12. Fan 32 draws a stream of ambient air 34 through a suitably formed opening 36 in the front wall 20, over a coil 38 described below, around a baffle 40, over the compressor/motor 26 and then out through the rear wall. An insulating noise deadening shroud 42 may be optionally provided on rear wall 12 to deaden internal noise. Similarly, the block of plastic foam material 40 serves to deaden the noise of the compressor/motor 26 and prevents its escape through the ambient air inlet 36.

The baffle 40 is part of the insulation throughout the lower cabinet space, including the underside of the shroud 42, which serves as sound deadening for this relatively noisy space. An advantage of this structure is to permit the cover of the invention to comprise a simple "U"-shaped piece of metal comprising the two side walls 14 and the top wall 16, thereby effecting ecomomies in cost of manufacture as well as reducing weight.

Process air enters the system through a combined inlet and muffler device 44, two forms of which (44 and 44A) are shown and described below. In addition, this component can be located in any one of two positions, indicated in FIG. 4 in phantom at 44 and the preferred position directly on the compressor intake 30 or 30A indicated at 44-1, see FIG. 11 and corresponding description below. The inlet air enters the upper space through screw holes and the like minor leakages in the cabinet. The flow of process air is quite small as compared to the flow of cooling air, for example, as an indication of orders of magnitude only, in the commercial embodiment of this invention, the flow of cooling air driven by fan 32 is 100 cubic feet per minute while the flow of process air is about 1 cubic foot per minute.

After either device 44 wherever positioned, process air is delivered via a line 46 to compressor 30, and then through a line 48 to the cooling coil 38 which is located at the inlet of the ambient air to thereby cool the process air and to remove most of the heat added by the compressor.

After coil 38, a line 50 passing through horizontal wall portion 24 delivers the cool compressed process air to an air filter and water trap device 52. A hose 54 delivers the minor amount of water separated out of the process air by device 52 to a block of foam 56 forming part of the insulation in the lower cabinet space. In this manner, the water is conveniently removed from the system, the foam material (polyurethane being preferred) acting as a "wick" and, together with the warmth in this part of the lower space, evaporating this water into the ambient cooling air 34 passing through the lower space.

Figure 16:
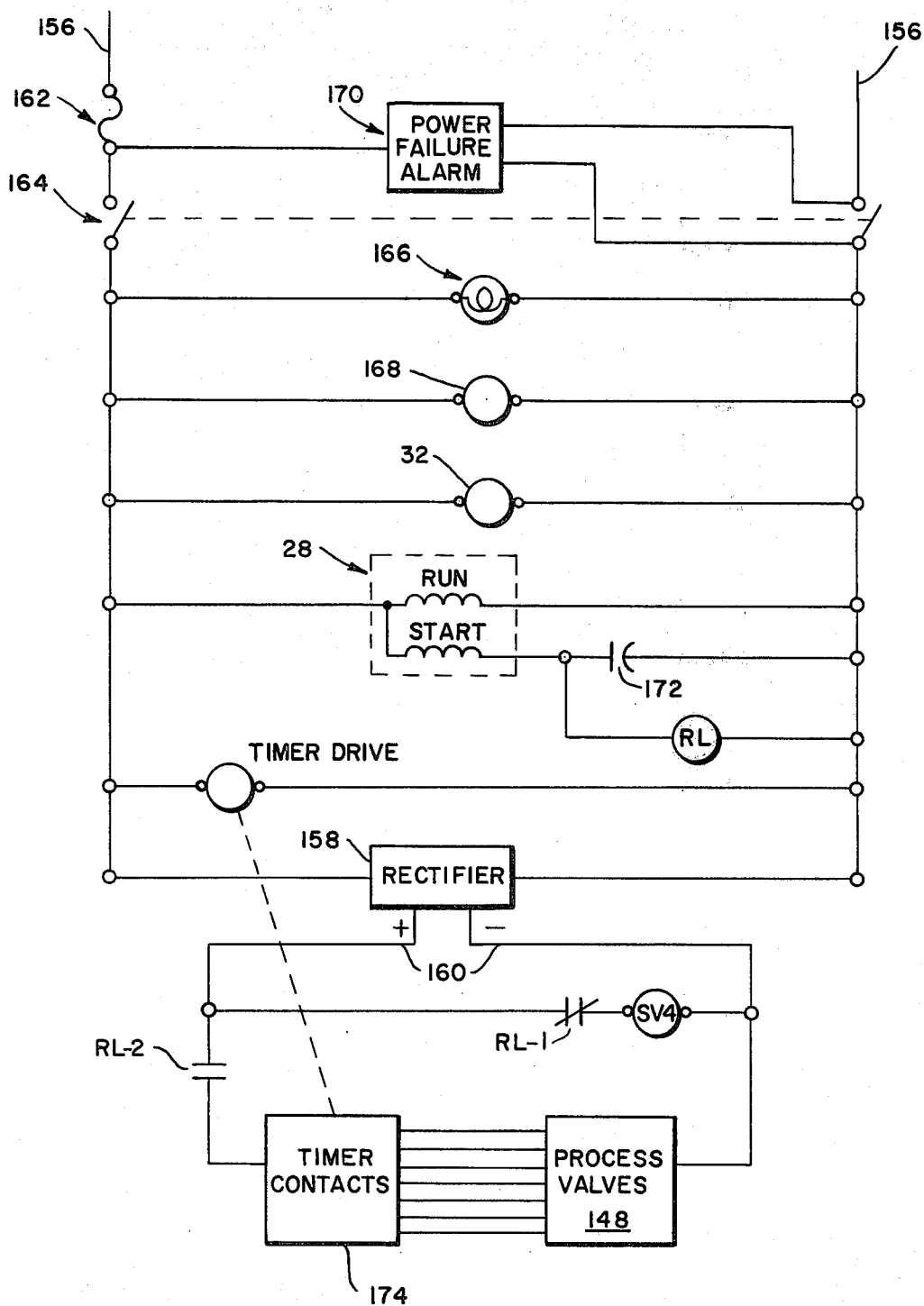
FIG. 16 is an electrical schematic diagram.

Line 56 delivers the cool compressed and now liquid free process air to the array of solenoid valves and associated equipment described below, and indicated collectively as "manifolding" 58 in FIG. 4. A branch of line 56 includes the "dumping" valve SV-4, which valve is used to unload the system to facilitate starting of the motor 28 in device 26, as will appear in greater detail below in regard to the description of the electrical circuit FIG. 16. The pair of arrows 60 schematically interconnect manifolding 58 with the beds of adsorbent material 62. A line 64 from manifolding 58 carries the waste or reject gas, which is primarily nitrogen, away from the manifolding, passes through horizontal wall 24 and ends at a muffler device 66 located in the lower cabinet space. At this point, the waste gas 68 joins the stream 34 of ambient air to be exhausted out of the system along therewith under the driving force of the fan 32.

The desired product gas is delivered from manifolding 58 by a line 70 to a pressure regulator 72 and then to a combined flow meter and control device 74. Thereafter, a conventional replaceable bacteria filter 76 cleanses the product stream, oxygen in the preferred embodiment, and product gas finally passes out through a fitting 78 and to the user. As is ordinary and conventional, if desired, a humidifier can be attached to fitting 78 to add moisture to the oxygen supplied to the user.

Figure 2:
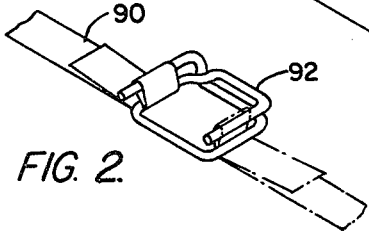
FIG. 2 is a partial view showing an alternate form of the motor/compressor hold-down means.
Figure 3:
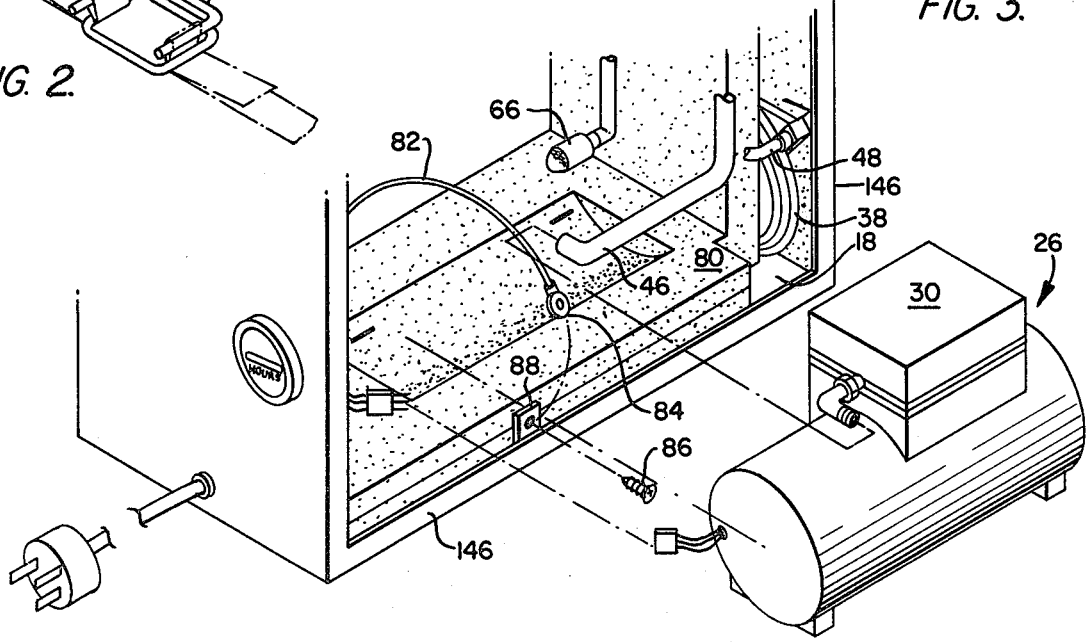
FIG. 3 is a view like FIG. 1 showing the manner of removal of the motor/compressor.

Referring now to FIGS. 1 to 3, there is shown the two alternate means for mounting the motor/compressor into the lower cabinet space. Bottom wall 18 is provided with a relatively thick block of polyurethane material 80 and a cavity is formed therein to snugly receive the underside of motor/compressor 26. Two alternate quick dis-connect means for holding the motor/compressor 26 tightly in place (primarily for shipment) are shown in FIGS. 1 and 2. In FIGS. 1 and 3, a strong cable 82, such as a braided steel wire, has its inner end secured (not shown) to bottom wall 18. Cable 82 has a washer 84 at its opposite end, which may be secured by a screw or the like quick disconnect means to a nut 88 welded to said bottom wall 18 or the adjacent portion of the flanging 146. Other equivalent means can of course be used, such as spade disconnects and any well known means for quickly making and breaking a cable or wire connection.

Referring to FIG. 2, an alternate form comprising a pair of straps 90 secured together by a strapping clip 92 is shown, the outer ends of the two straps being secured to the bottom wall 18 in any conventional manner. Strapping has the advantage of being of lighter weight, easy to adjust as to length and of lower cost than cable 82 and its associated parts. Conventional plastic strapping used to package heavy goods may be used.

The motor securing means 90 and 82 are provided primarily for shipping as the motor/compressor is relatively heavy. This unavoidable weight is used to advantage in the invention as the formed cavity together therewith causes the motor/compressor to stay in place of its own weight while in use. The strapping or securing means of whatever sort are preferably left loose on the device so that these means do not themselves become a transmitter of the noise and vibration in the lower cabinet space.

Figure 5:
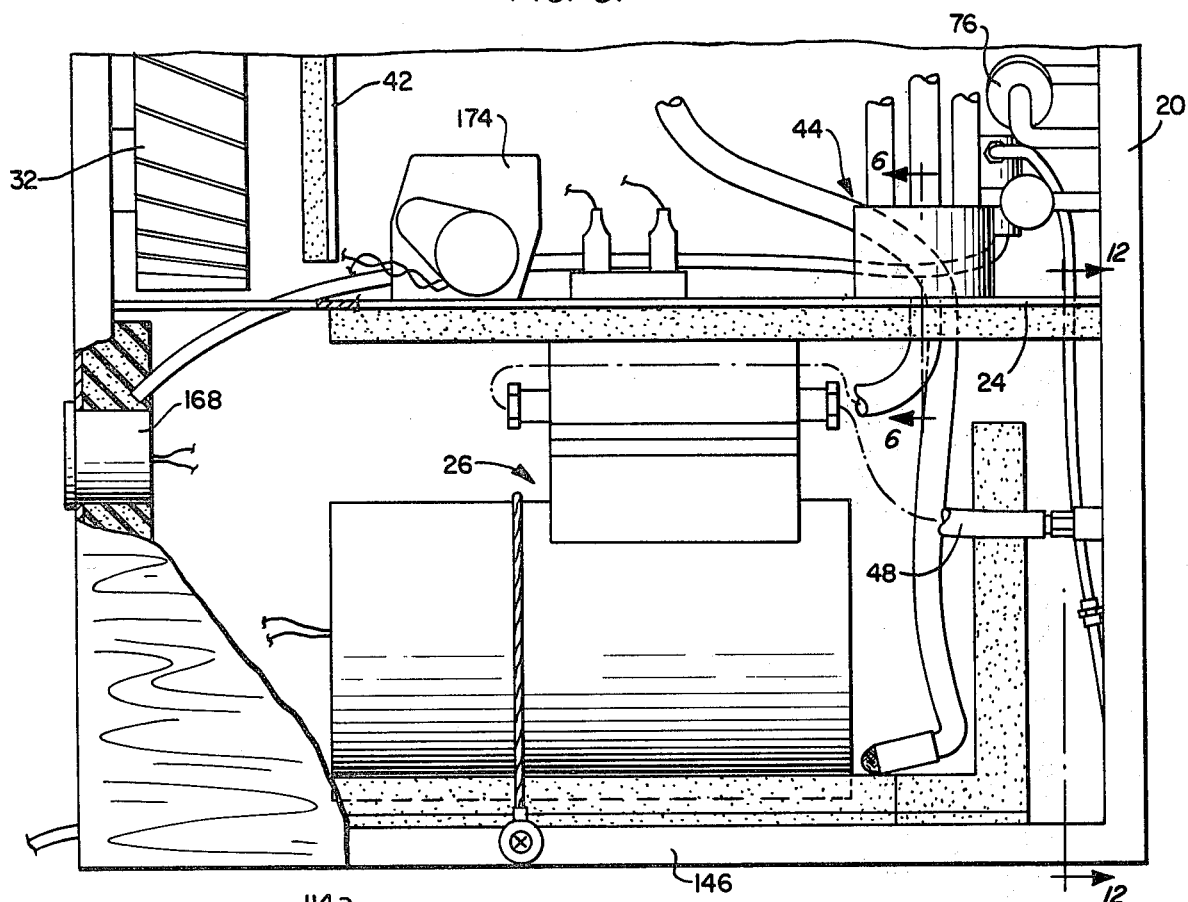
FIG. 5 is a side elevational view thereof with the side wall partly broken away.
Figure 8:
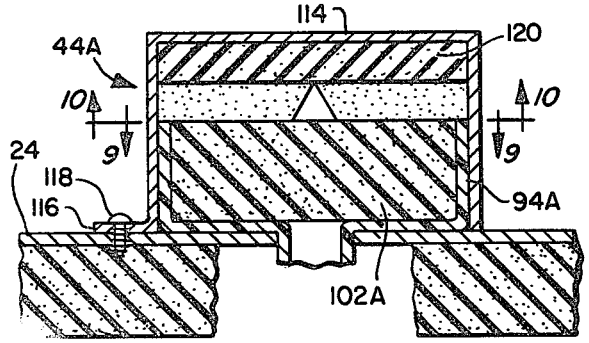
FIG. 8 is a view like FIG. 6 showing an alternate form of the process air intake muffler/filter.
Figure 9:
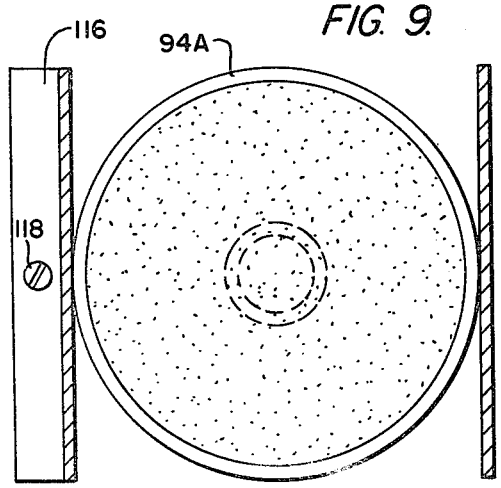
FIG. 9 is a cross-sectional view of a detail taken on line 9—9 of FIG. 8.
Figure 10:
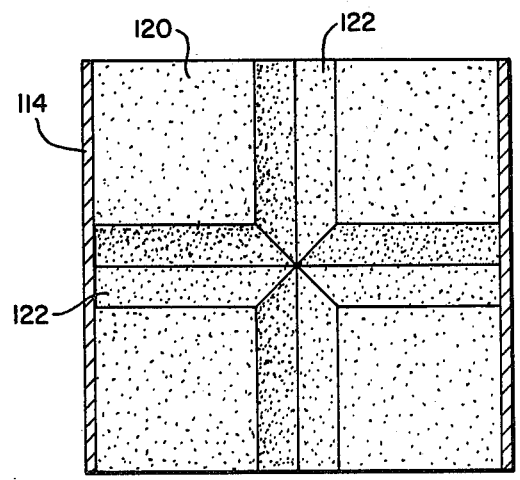
FIG. 10 is a cross-sectional view taken on line 10—10 of FIG. 8.
Figure 6:
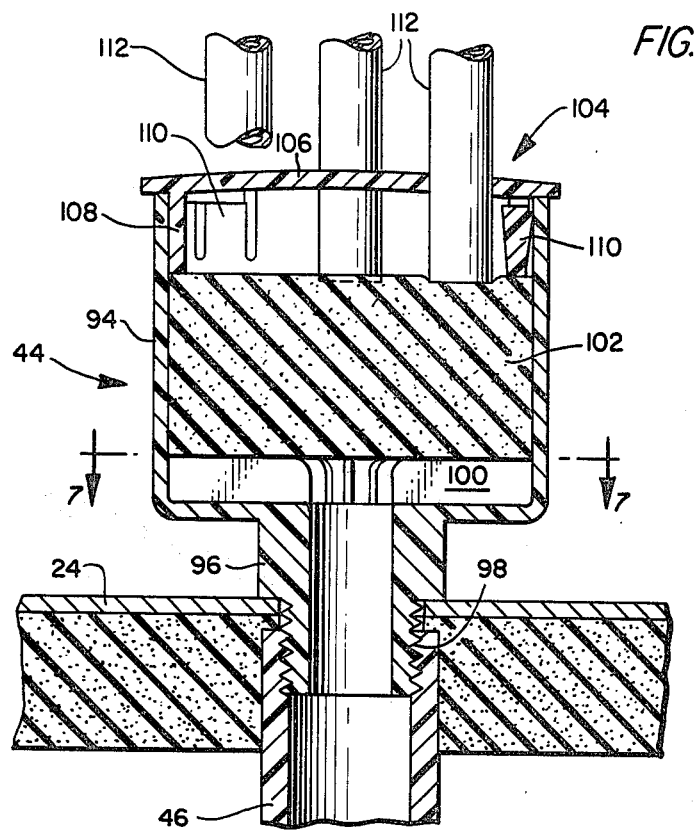
FIG. 6 is a partial cross-sectional view taken on line 6—6 of FIG. 5 showing the preferred form of the process intake muffler/filter in the alternate mounting in the upper cabinet space.
Figure 7:
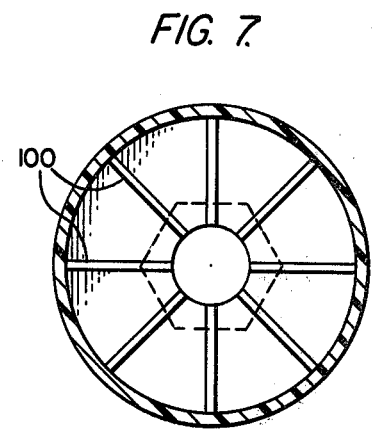
FIG. 7 is a cross-sectional view taken on line 7—7 of FIG. 6.

Means are provided to filter the process air taken in by the compressor 30, and to muffle the noise of the compressor which might otherwise exit from the intake. To this end, a combined muffler-filter device 44 is provided. The preferred form of the device 44 is shown in FIGS. 5, 6 and 7, and an alternate form 44A is shown in FIGS. 8, 9 and 10. Either device 44 or 44A can be mounted into one of two positions, on the horizontal wall 24 and in the upper cabinet space as shown in FIG. 5; or directly on the intake to the compressor 30, as indicated in FIG. 11 at 44-1. In the schematic of FIG. 4, both these positions 44 and 44-1 are shown. Referring to FIGS. 4, 5 and 11, it can be seen that the compressor/motor 26 can be mounted in one or two positions, i.e., with the compressor positioned to the right as at 30, to the left as indicated at 30A. Slight changes in the length and directions of the surrounding lines are necessary as indicated in FIGS. 4, 5 and 11.

The device 44 of FIGS. 6 and 7 and the 44-1 position are preferred so that the intake tubes 112 are located closely adjacent the inlet of the ambient air into the lower cabinet space so that the air entering the process is as cool as possible, to increase efficiency, as is well known to those skilled in these arts. Another advantage of the 44-1 position is that the inlet tube between the device 44 or 44A and the compressor suction intake is entirely eliminated.

Referring to FIGS. 6 and 7, the details of the preferred embodiment of the device 44 is shown. The device 44 comprises a cup member 94 having an opening through its lower end which is defined by a nut portion 96 and a threaded nipple portion 98. A plurality of upstanding radially disposed flanges 100 are provided at the bottom of the cup, see FIG. 7. A disk or pad 102 of plastic foam material is located within the cup, is seated snugly on top of flanges 100, and has its upper end located below the top of the cup. A lid 104 has a top wall 106 and an annular depending wall 108 which snugly fits within the inside of the cup 94. To secure the lid tightly in place, annular wall 108 is formed with a plurality of integral spring fingers 110 which hold the lid 104 snugly within the cup. Lid top wall 106 is formed with a plurality of openings which snugly receive a plurality of relatively thin tubes 112 which extend away from the member 44 to draw air in from the cooler cabinet space, see FIG. 4 and discussion above. Four such tubes 112 are provided in the preferred embodiment. These tubes may or need not bear against the foam block 102, which in either case assures that air is drawn only through the tubes and through the filter block into the suction side of the compressor. Compressor intake is via tube 46 which connects to the nipple portion 98, which portion extends through a suitably formed opening in the horizontal wall 24 and bears thereagainst via the underside of the hex portion 96. The flanges 100 hold the block 102 up away from the opening through the nipple portion 98 so that the suction from the compressor can draw air through all of the foam block 102. In the 44-1 FIG. 11 position the device is attached directly to the compressor intake port using conventional hardware.

The plurality of tubes 112 in the inlet device 44 serve as additional sound deadening means. By selectively cutting the lengths of these tubes to match the particular compressor used, a "tuned" effect can be obtained, similar to that obtained with automobiles, i.e., where the lengths of the exhaust pipes are made such that the noise is minimized or maximized, (of course the noise is sought to be minimized in the invention).

Referring now to FIGS. 8, 9 and 10, there is shown an alternate form 44A of the combined intake muffler and air filter. This form comprises a cup 94A containing a block of filter material 102A corresponding generally to the same parts described above. Embodiment 44A includes a three sided shroud 114 having a flange portion 116 which is secured to the horizontal partition wall 24 by a single self-tapping screw 118. A second square foam block 120 sits on top of the cup 94A and fits snugly under the three sided shroud 14. This block 120 is formed with a pair of "V"-shaped in cross-section grooves intersecting each other at right angles as shown in FIG. 10.

An advantage of this embodiment 44A is that cleaning is greatly simplified. The block 120 is square and therefore can be inserted in one side of the three sided shroud 114 in either of its two orientations, the intersecting "V" grooves 122 serving as air supplies to the underlying main filtering block 102A. Both embodiments 44 and 44A have the advantages of being usable in either position, in the upper or lower cabinet space; and using inexpensive plastic cups with foam plastic inserts which both effectively filter dust and the like from the process air while at the same time deadening the sound from the motor/compressor.

Another variation of the FIG. 10 embodiment would be to provide a "waffle" like pattern on the bottom surface of the block 120 (in place of crossing grooves) thus even further simplifying insertion of this filter block under the shroud 114. Such a waffle pattern could be easily pressed into both sides of block 120, thus further precluding the possibility of incorrect mounting.

Figure 12:
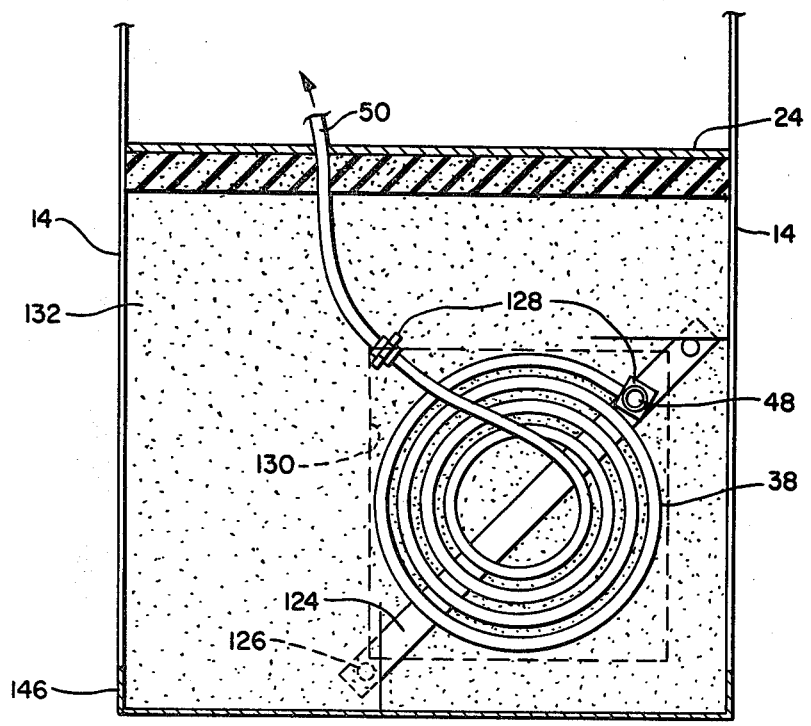
FIG. 12 is a cross-sectional view taken on line 12—12 of FIG. 5 showing the improved process air cooling coil.

Referring now to FIG. 12, there is shown the improved process air coiled tube heat exchanger 38. In the commercial embodiment, this coil is made of copper tubing, and is brazed or otherwise secured to a strap 124 which is in turn secured by suitable means 126 to the cabinet front wall 20. Conventional plumbing type fittings 128 are provided to joint the ends of the coil 38 to its inlet and outlet lines 48 and 50, respectively. The coil is positioned in front of a suitably formed opening 130 in the front wall 20, said opening 130 being screened by a thin foam pad 132 which serves to both filter the cooling air entering the lower cabinet space as well as to, in cooperation with the baffle 40, help deaden the sound of the compressor so that it does not exit through this opening. The coil 38 also holds the foam pad 132 in place. The securing means 126 are preferable of one of the commercially available "blind" varieties, whereby no screw point or the like extends outside of front wall 20 to mar its appearance.

Figure 14:
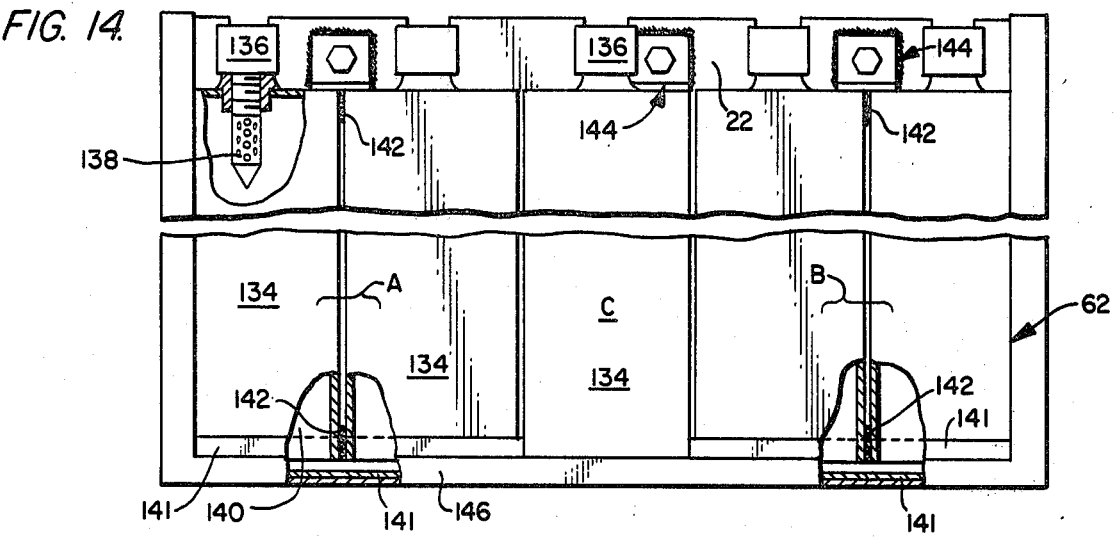
FIG. 14 is a side elevational view showing the tanks housing the adsorbent beds taken on line 14—14 of FIG. 13, with certain parts broken away and in cross-section.
Figure 13:
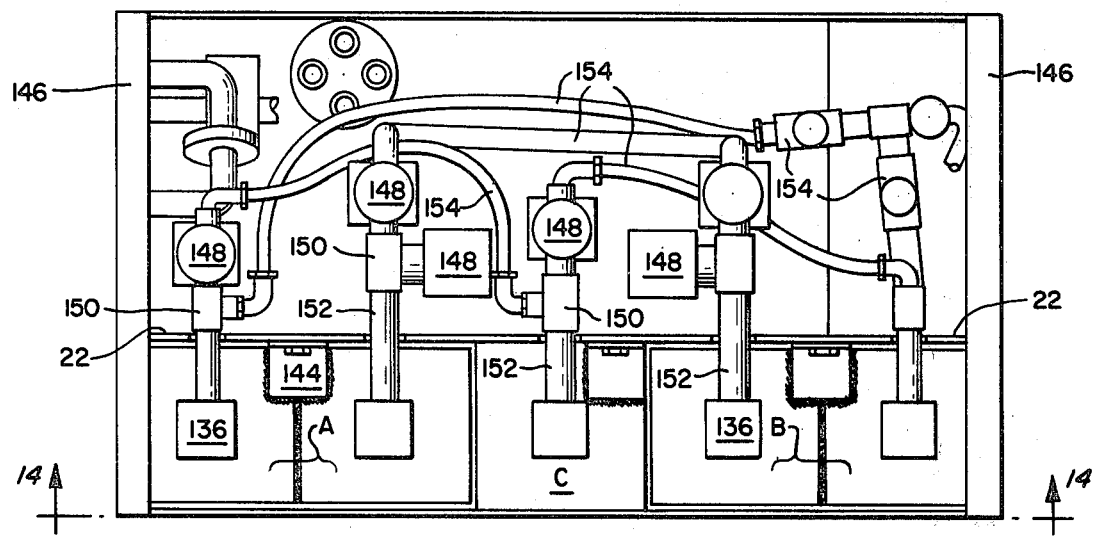
FIG. 13 is a top plan view with the cover removed.
Figure 15:
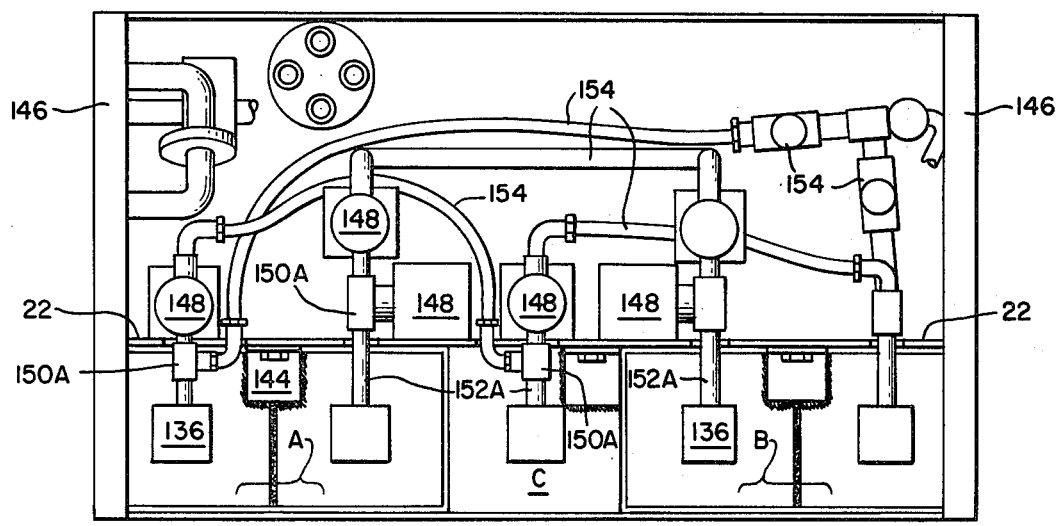
FIG. 15 is a view like FIG. 13 showing an alternate form of connecting the valves to the beds.

Referring now to FIGS. 13, 14 and 15, the arrangement of the solenoid valves required by a particular PSA cycle, as well as the details of the vessels used to house the molecular sieve beds are shown.

In FIG. 14 the three beds 62 utilized in the commercial embodiment of the invention are shown. The invention is aided to achieve its compactness by the use of square cross-section tubing or pipe for the beds or vessels, as well as by the use of a "folded" bed design. For ease of description, the beds will be called A, B, and C, with the A and B beds being the larger folded ones, and Another advantage of this part of the invention is that the process valves 148 are arranged to be in a normally closed position, that is, to lock in the pressure in the beds whenever the system is shutdown and during start up. Absent this feature, when SV-4 opens during start up, it would allow all pressure in the beds to exit the system along with the pressurized air from compressor 30. Such a depressurizing of the beds is undesirable because time must be taken to repressurize them for subsequent operation. Thus, the contacts RL-2 shown in FIG. 16 produce the additional advantage of allowing the process valves 148 to remain in their normally closed position holding the beds pressurized until the motor is up to speed and the system is ready to start production.

Another advantage is that the valves used in the invention have the capability of preventing back flow out of the beds. In some prior art products there was a check valve in the line between parts corresponding to SV-4 and the beds. This check valve permitted flow only from the compressor to the beds and not in the reverse direction, but it also caused back pressure and a restriction to flow which are highly undesirable. In the present invention, the normally closed positions of the solenoid valves also serve the function of this check valve by holding the beds locked in during start up, thus eliminating the check valve which effected economies in manufacture and which eliminated the restriction in the flow from the compressor to the beds.

Returning to the motor 28 and its modus operandi, PSC motors have the characteristic that the start coil is always wired into the circuit. The voltage across this start coil begins at a relatively low level and builds up to a relatively high level in direct proportion to the speed of the motor. Thus, start coil voltage is at a predetermined high level only when the motor is running at full speed. This characteristic is utilized in the invention circuit in that the capacitor 172 will "track" or always be at the voltage on the start coil. The coil RL of the unloading relay or starting relay will also track this voltage in that this coil is in parallel with the capacitor. Thus, by selecting a coil which will operate at a particular voltage, which voltage is selected or made to correspond to the voltage on the motor start coil when the motor is at full speed, the valve SV-4 can be made to operate or not operate to allow the compressor and the motor in turn to experience its load only when the motor is up to full speed.

More specifically, as the motor builds up to speed, and at all speeds short of full speed, the relay RL will be in its inactivated state, its contacts RL-1 will be closed, and the normally closed solenoid valve SV-4 will therefore be open, thus unloading the compressor. This condition will maintain continuously until the motor 28 is at full speed. When the motor gets to full speed, the voltage on the start coil will be reflected on the capacitor 172 and the coil RL, thus causing this coil to operate. When this occurs, RL-1 goes to its activated open condition, causing SV-4 to return to its unactivated normally closed condition, thus stopping the "dumping" of the compressed air from the compressor 30. Simultaneously, the normally open contacts RL-2 will go to their activated closed condition, thus holding the timer 174 closed, to permit the process valves 148 to operate to carry out the particular PSA cycle.

There is a transformer-like effect between the two coils of the motor 28, and it is this effect which causes the proportional increases of voltage on the motor start coil as described above.

In this manner the circuit assures that the compressor is unloaded from the system to assure a smooth start-up until the motor is at full speed.

In a particular embodiment, to avoid precise winding of the coil RL-1, it is possible to put a fixed or variable resistance in series with coil RL, thereby permitting "trimming" of the voltage at which RL will operate. Such a trimming technique is well known to those skilled in these arts.

Still another aspect of this circuit portion of the invention is that it could be used with motors other than PSC motors. For example, even conventional motors would operate better and more efficiently if they were not subject to their load until after they were up to substantially full speed. Thus, the invention has general utility with electric motors, however, some variation or modification would have to be made to duplicate the effect of the start coil of a PSC type motor.

While the invention has been described in detail above, it is to be understood that this detailed description is by way of example only, and the protection granted is to be limited only within the spirit of the invention and the scope of the following claims.

We claim:

1. A machine for separating a constituent gas out of air using pressure swing adsorption, said machine including air compressor means, at least one vessel containing a bed of adsorbent material, said adsorbent material preferentially adsorbing at least one of the constituent gases in the air, a plurality of solenoid valves to control gas flows into and out of said at least one vessel, all of said plurality of solenoid valves being normally closed (no flow), control means for operating said solenoid valves in a cyclical manner to achieve alternate adsorption of said at least one constituent gas in and purging of said at least one constituent gas out of said at least one bed of adsorbent material according to a pressure swing adsorption technique, an unloading solenoid valve operatively cooperative with said compressor means, and said control means comprising means for electrically operating said unloading solenoid valve for dumping the compressor means air output until the pressure swing adsorption system is prepared to operate.

2. The combination of claim 1, and manifold means interconnecting said plurality of solenoid valves to said at least one vessel, said manifold means comprising rigid pipe connections between said solenoid valves and said at least one vessel, whereby said manifold means may be pre-assembled prior to connection to said at least one vessel.

3. The combination of claim 1, and manifold means interconnecting said plurality of solenoid valves to said at least one vessel, a compact housing for said machine, wall means at least partially defining the space within said housing, and said manifold means comprising means to mount said plurality of solenoid valves on said wall means, whereby flexible connections may be used in said manifold means.

4. The combination of claim 3, and means to mount said at least one vessel on said wall means.

5. The combination of claim 1, a compact housing for said machine comprising first wall means defining a first space within the housing, second wall means dividing the remaining space in said housing into a second and a third space, means to mount the adsorbent beds of said machine in said first space to substantially completely fill said first space, means to mount the motor and compressor of said compressor means in said second space, and means to mount substantially all of the remaining internal components of said machine in said third space.

6. The combination of claim 5, said first wall means being vertically disposed, said first space extending substantially completely from top to bottom and from front to rear of said housing, said second wall means being horizontally disposed and extending at a predetermined height from said first wall means to one side of said housing and from front to rear of said housing, and means to insulate said second space.

7. The combination of claim 6, said second space being located below said horizontal wall means and below said third space.

8. The combination of claim 6, said second space insulating means comprising plastic foam material, said remaining internal components including a water trap, and conduit means to flow the water trapped by said water trap from said third space into said second space foam insulation, whereby said water may be evaporated out of said foam.

9. The combination of claim 6, said insulation means extending coextensively with said first wall means and defining the separation between said first and second spaces.

10. The combination of claim 1, said air compressor means comprising a motor and a compressor, a compact housing for said PSA machine having an insulated motor and compressor space, combined filter and muffler means to intake air for said compressor, means to locate said combined filter and muffler means in said housing at a predetermined location to intake relatively cool air for said compressor, and means interconnecting said combined filter and muffler means to the air intake of said compressor.

11. The combination of claim 10, said combined filter and muffler means comprising a pad of foam plastic material so positioned with respect to the entrance end of said interconnecting means that all of the air taken in by said compressor is filtered by said pad.

12. The combination of claim 11, said combined filter and muffler means comprising means to permit ready removal and replacement of said pad therein for cleaning or replacement of said pad.

13. The combination of claim 11, said combined filter and muffler means comprising a cup member having nipple means at one end for cooperation with said interconnecting means, support means at the nipple means end of said cup to hold said pad in spaced relation to the air exit through said nipple means, a lid member closing the other end of said cup, friction means to hold said lid snugly on said other end of said cup, and a plurality of inlet tubes mounted on said lid member, the lengths of said inlet tubes being such as to muffle the noise of said compressor reaching said combined filter and muffler means via said conduit means.

14. The combination of claim 10, means in said housing defining another space containing a substantial portion of the remainder of the internal working components of said machine, said another space being substantially cooler than said compressor space when said machine is operating, said predetermined location comprising said another space, and said interconnecting means comprising conduit means.

15. The combination of claim 10, means to cause a flow of ambient air for cooling through said insulated motor and compressor space, said interconnecting means comprising means to mount said combined filter and muffler directly on the air intake of said compressor in such an orientation that the inlet of said combined filter and muffler means is closely adjacent the cooling air intake to said motor and compressor space, whereby said predetermined location comprises the vicinity of said cooling air intake.

16. The combination of claim 10, said combined filter and muffler means comprising a cup member open at one end and housing means at its other end for fluid flow cooperation with said conduit means, shroud means in closely spaced relation to said cup and having a portion in predetermined spaced relation to said open end of said cup, and a second pad adapted to snugly fit in the space between the open end of said cup and said portion of said shroud, said second pad comprising air flow passage means facing said open end of said cup in the assembled condition of said second pad in said shroud.

17. The combination of claim 16, said cup and said first pad being of generally circular cross-sectional shape, and said shroud and said second pad being of generally square cross-sectional shape having a side length corresponding to the diameter of said circular shape.

18. The combination of claim 16, said air flow passage means comprising a pair of right angle intersecting grooves formed in at least one side of said second pad.

19. The combination of claim 16, said air flow passage means comprising a waffle-like pattern of grooves formed in at least one side of said second pad.

20. The combination of claim 1, a compact housing for said machine having a first space separated from a second space, said air compressor means comprising an air motor and a compressor in said first space, insulation means for said first space, means to flow a stream of ambient air through said first space to carry the heat generated by said motor and compressor out of said first space, means to connect the intake side of said compressor to process air intake means, and heat exchange means connected to the output end of said compressor and prior to operating portions of said machine located in said flow of ambient air to extract at least some of the heat in the compressed process air before said air undergoes the PSA process in said machine.

21. The combination of claim 20, said heat exchange means comprising a coiled tube heat exchanger.

22. The combination of claim 21, and means to mount said coiled tube heat exchanger at the inlet of said air flow into said first space.

23. The combination of claim 20, means to flow the blow-down gas from said machine into said first space to co-mingle said blow-down gas with said flow of ambient air, and means to muffle the exit end of said blow-down gas flow means.

24. The combination of claim 20, and baffle means in said first space between the inlet of said flow of air into said first space and said motor and compressor means.

25. The combination of claim 20, means to locate said process air intake means at the inlet port of said compressor with the intake end of said intake means being located in closely spaced relation to the intake of said ambient cooling air into said first space.

26. The combination of claim 20, means to locate said process air intake means in said second space, and conduit means interconnecting said intake means in said second space to the inlet part of said compressor means.

27. The combination of claim 1, said vessel comprising the use of a predetermined length of rectilinear cross-section pipe as the body of said vessel, means to close the ends of said length of pipe, and means to permit the flow of gas through said end closing means, whereby a plurality of said vessels may be arranged in closely spaced relation to each other to thereby permit said machine to be contained in a compact housing.

28. The combination of claim 27, said gas flow means comprising filter means joined to said end closing means.

29. The combination of claim 27, said pipe being of square cross-section.

30. The combination of claim 27, said vessel comprising a pair of substantially equal lengths of said pipe, means to join said pair together longitudinally side-by-side and to permit gas flow communication between said pipes at one end of the joined together pair, and one of said gas flow permitting means in each of the end closing means at the other ends of the joined together part, whereby the functional length of the absorbent bed in said vessel in substantially equal to twice the length of one of said pipes and the physical length of said vessel is substantially equal to the length of one of said pipes.

31. The combination of claim 30, said means to join and permit gas flow comprising a pan-like member at said one end of said pair with the ends of said pair terminating short of the base of said pan-like member, whereby gas flow communication can be had between said one end of said pair through the space defined by said pan-like member.

32. The combination of claim 1, said air compressor means comprising a single motor/compressor unit, a compact housing for said machine, a shipping system for said motor/compressor in said compact housing, a plurality of defined spaces within said housing, at least one of said spaces being used to house said motor/compressor and being substantially entirely lined with foam plastic material adapted to insulate said space to prevent the noise and heat generated by said motor/compressor from exiting said space in an uncontrolled manner, said shipping system comprising foam plastic insulating material adapted to fit the underside of said motor/compressor, and quick release securing means anchored to said housing, whereby said motor/compressor is held securely in place on said foam during shipment of said machine and said motor/compressor rests of its own weight only and with no metal-to-metal contact after release of said securing means during operation of said machine.

33. The combination of claim 32, said quick release securing means comprising a cable joined to said housing at one end to one side of said motor/compressor and having means at its other end cooperative with mating means joined to said housing on the opposite side of said motor/compressor, said means at said other end of said cable together with said mating means comprising the quick release/attach portion of said quick release securing means.

34. The combination of claim 32, said quick release means comprising a pair of straps each having one end secured to said housing on opposite sides of said motor/compressor when said motor/compressor is in said cavity, and a quick release clip cooperative with the free ends of said pair of straps to permit said straps to be drawn tightly onto said motor/compressor and to permit said straps to be quickly released from said motor/compressor.

35. The combination of claim 34, an electric motor for driving said air compressor means, an electrical control circuit to permit said motor to be connected in driving and output relation to said compressor means only after said air motor is at substantially full operating speed, motor speed responsive unloading means in circuit with said motor, and said unloading means comprising a portion operatively cooperative with and adapted to unload said compressor means until said motor is up to substantially full operating speed and to thereafter apply compressor load to said motor.

36. The combination of claim 35, said compressor and said motor speed responsive unloading means including said unloading solenoid valve on the output side of said air compressor.

37. The circuit of claim 35, wherein said motor is a PSC type motor having a start winding and a run winding.

38. The combination of claim 37, said unloading means comprising an unloading solenoid valve on the output side of said compressor and a relay having its coil in circuit with said motor start winding and its contact means in circuit with said unloading solenoid valve.

39. The combination of claim 37, said voltage responsive unloading means comprising a start relay having its coil in circuit with said motor start coil whereby both said coils experience the same voltage, said relay having a pair of normally closed contacts in series circuit with said solenoid valve, said solenoid valve being a normally closed (no flow) valve, whereby said relay coil is deactivated and said contacts hold said valve activated to open flow condition until said motor is at substantially full running speed.

40. The combination of claim 35, said circuit further comprising power failure alarm means.

* * * * *